3,098,048
DETERGENT POLYURETHANE PRODUCTS
Morris V. Shelanski, Gulph Mills, and Theodore Levenson, Philadelphia, Pa., assignors to Industrial Biology Laboratories, Inc., Philadelphia, Pa., a corporation of Pennsylvania
No Drawing. Filed Sept. 26, 1958, Ser. No. 763,467
12 Claims. (Cl. 260—2.5)

This invention relates to novel polyurethanes which produce foams and films with unusual and highly desirable properties.

The foams of the instant invention resemble natural sponges, are soft to the feel and are economical since they expand to about two and one-half times their original volume when wet with water. They are and remain odor free, easily washed free of dirt and have great resistance to abrasion. Thus the foams are eminently suitable for the personal bath. When ground up and mixed with clay soil they will condition soil by preventing shrinkage and hardening of the soil. Plants appear to grow better in a soil containing about 4% by weight of ground up sponge. They may be employed as reusable urine and feces catchers for experimental animals and in many other ways. The flexible foam is capable of picking up from an atmosphere saturated with water vapor about 40% of its weight in water. This foam does not appear "wet" and has excellent fire retardant properties.

One of the most salient features of the present foams is their detergency, i.e. the ability of the foams to release a surfactant in small amounts over a relatively long period of time in the presence of water thus rendering the foams self-cleaning.

The films of the instant invention are elastic, strong, hydrophilic, inert to oil and can be easily dyed. The film adheres to itself when stretched but can be peeled off from itself.

As is well known, the initial reaction of an isocyanate and a compound having a free hydroxyl group produces a urethane. If a molecule containing at least two isocyanato groups is reacted with a compound containing at least two hydroxyl groups, polymers known as polyurethanes may be formed. The end groups of the polymer may be OH where a polyhydroxylic compound was present in excess or NCO groups when a polyisocyanate was present in excess. Thus in the case of the polymer with end NCO groups, the polymer may continue to grow; and if the hydroxylic compound had more than two hydroxyl functions, the polymer could grow in other directions.

The reaction of a dihydroxy compound with an equivalent quantity of a di-isocyanate is generally exothermic and when completed, the viscosity of the mixture has usually increased. If an excess of di-isocyanate is added to this reaction product and then intimately mixed with a basic catalyst and water, a foam is produced, due it is believed to the following reactions:

(1)
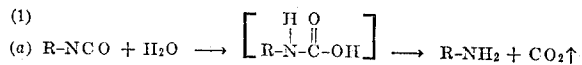

(b) 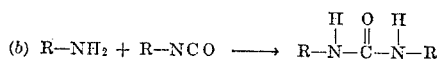

(2) 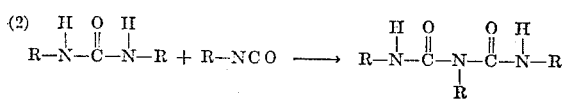

Reaction 2 is presumably responsible for cross linking and polymer growth, i.e. the general strengthening of the foam. It is believed that the relative rates of Reactions 1 and 2 determine the success of the foam. Typical basic catalysts capable of speeding up these reactions are N-methyl morpholine, triethylamine, dimethylethanolamine, N-(2-hydroxypropyl) dimethyl morpholine, etc. The weakly basic dimethyl formamide is a catalyst which has especially desirable properties in some of the foams of the instant invention.

We have discovered that a foam having the unusual properties heretofore mentioned may be made employing the above reactions when the starting material is a surfactant having sequentially added hydrophobic and hydrophilic portions, the hydrophobic portion being selected from such materials as propylene oxide polymer, ethylene diamine to which propylene oxide has been added, alkyl phosphate, alkyl amide, dicarboxy fatty acid alkyl, dihydroxy fatty acid alkyl, and the hydrophilic portion consisting of an ethylene oxide chain attached to each of the functional groups of the hydrophobic portion with the final product having an ethylene oxide content of 30 to 80% by weight. Examples of the starting material are certain of the Ethomids, made by Armour Company and certain of the Pluronics and Tetronics made by Wyandotte Chemicals Corp. The Ethomids are non-ionic surfactants produced by reacting fatty acid amides with ethylene oxide. Ethomids containing about 5 to 100 moles of ethylene oxide per mole of fatty acid amide may be used. The Ethomids are described in a booklet entitled "Armour Etho Chemicals," published by Armour Chemical Division of Armour and Company, copyrighted 1955. Ethomid HT/60 is a surfactant produced by reacting hydrogenated tallow amide with 50 moles of ethylene oxide. The Pluronics are a series of high molecular weight, non-ionic surfactants prepared by condensing ethylene oxide with a hydrophobic base formed by the condensation of propylene oxide and propylene glycol. The Pluronics which are used in the instant invention are made by condensing ethylene oxide with a hydrophobic base made from a polymer of propylene oxide. The hydrophobic base used as examples has a molecular weight of 1500–1800. The ethylene oxide portion must then be at least 40% by weight. The Pluronics are described in a brochure entitled "Presenting the Pluronic Grid," published by the Wyandotte Chemical Corporation (Form No. 499–MULCO–140M). The Pluronics are also described in conjunction with the aforesaid Tetronics in an article entitled "Tetronic Series—New Nonionic Surface Active Agents," contained in a brochure entitled "Market Development," published by the Wyandotte Chemical Corporation on November 9, 1956. On page 1 of this publication it is stated that both the Tetronics and Pluronics are prepared by the sequential addition of propylene and ethylene oxides either to ethylenediamine, as in the Tetronics, or to propylene glycol, as in the Pluronics.

Similarly, if the hydrophobic base has a lower molecular weight, then the ethylene oxide content will have to be higher initially in order to obtain at least 30% by weight of ethylene oxide in the final product. If the hydrophobic base has a higher molecular weight, then the ethylene oxide content may be slightly lower in order to obtain 30% by weight of ethylene oxide in the final product.

The Tetronics are similar to the Pluronics except that the initial material is ethylene diamine instead of propylene glycol.

Regarding the di-isocyanates which react with the aforementioned surfactants, we have found that our best foams and films may be made with the Nacconates, products of Allied Chemical & Dye Corp. The commercially available Nacconates (similar materials are produced by the Du Pont Company under the trade name Hylenes) may be essentially pure compounds or mixtures of position isomers. They may be liquids or solids. Nacconate 100 is a pure 2,4-tolylene diisocyanate. Nacconate 80 is a mixture containing 80% of the 2,4-compound and 20% of the 2,6-compound. Nacconate 65 is a mixture containing 65% of the 2,4-compound and 35% of the 2,6-compound. The best foams are made from mixtures of isomers. An unusually strong, high density foam results from the use of Nacconate 200 which is 3,3'-bitolylene-4,4'-diisocyanate.

The following are illustrative, but non-limitative examples of foams made in accordance with the instant invention.

*Example I*

115 g. of Ethomid HT/60 (50 moles of ethylene oxide) and 8.28 ml. of Nacconate 80 (80% of 2,4 isomer, 20% of 2,6 isomer) are mixed and allowed to react at approximately 110° C. for about one hour, after which the reaction mixture is cooled to about 60° C. 27.6 ml. of Nacconate 80 and 18.4 ml. of dimethyl formamide and 18.4 ml. of Ethomid HT/60 are then aded to the reaction mixture to form the prepolymer. A small amount of water is intimately admixed with the prepolymer and the foam is allowed to grow, preferably in a mold of desired size and shape. When the foam is complete it is cured overnight in a 70° C. oven.

This foam possesses optimum properties of strength, expansibility, ease of rinsing, etc.

*Example II*

The process of Example I is carried out except that Nacconate 65 (65% of the 2,4 isomer and 35% of the 2,6 isomer) is used instead of Nacconate 80.

*Example III*

The process of Example I is carried out except that to the Ethomid HT/60 is added, in 10% by weight, a quaternary ammonium iodide formed from Ethomeen 18/25, a tertiary amine made by Armour Company having the structure:

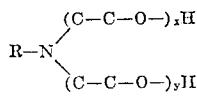

wherein $R=C_{18}H_{37}$ and $x+y=15$ and methyl iodide.

This foam is partially cationic in character which when used to soak up a surface active agent, such as Ultrawet K, a sodium alkyl aryl sulfonate, an anionic detergent made by Atlantic Refining Company, will release large quantities of suds repeatedly over an extended period of time. It is to be understood that the quaternary ammonium compound may be a halide other than the iodide having the same structure as specified hereinabove with R being a fatty acid alkyl radical of $C_{12}$ to $C_{18}$ and $x+y=a$bout 5 to 100.

*Example IV*

To 50 g. of dry Pluronic F68 (80% ethylene oxide) is added 2 ml. Nacconate 80 and the mixture is stirred for about 2 hours at approximately 120° C. in a system open via a capillary. An additional 12 ml. of Nacconate 80 is added and then cooled to room temperature to form a solid prepolymer. To 25 g. of the melted prepolymer is added 0.895 ml. of this catalyst mixture (10 g. N-methyl morpholine, 2 g. triethylamine, 3 g. Pluronic L–62 (20% ethylene oxide) and 35 g. $H_2O$), with constant stirring and the foam is allowed to stand at room temperature for 1 hour. It is then cured by drying at 70° C. for approximately 24 hours.

Although the freshly made foam is somewhat softer and weaker than the Ethomid HT/60 sponge of Example I, it is white, expands with water and shrinks when dry.

*Example V*

To 50 g. of dry Pluronic L64 (40% ethylene oxide) is added 3.6 ml. of Nacconate 80 and the mixture is stirred for about 2 hours at approximately 120° C. in a closed system except for a capillary. 10 ml. more of Nacconate 80 is added and the mixture is allowed to cool to room temperature to form the prepolymer. 33 mg. of silicone oil is added with stirring to 20 g. of the prepolymer and then 0.716 ml. of the catalyst mixture described in Example IV is added and the entire mixture is stirred producing the foam. The foam is allowed to stand at room temperature for 1 hour and is then cured by drying at 70° C. for 24 hours.

This foam is expansible with water but much less so than the foam of Example IV.

*Example VI*

50 g. of Ethomid HT/60 and 6.4 g. of Nacconate 200 are stirred at 110° C. for an hour. Nacconate 200 is 3,3'-bitolylene-4,4' di-isocyanate, a crystalline solid melting at about 70° C. An additional 22 g. of Nacconate 200 is added, the mixture cooled to about 70° C. then 8 ml. of dimethyl formamide and 8 ml. Ethomid HT/60 are added to form the prepolymer. With 25 g. of the prepolymer is intimately admixed 0.66 ml. of 5% Ethomid HT/60 in water. The high density foam hardens quickly, has enormous impact strength making it eminently suitable as a crash pad, and still expands with water.

*Example VII*

350 g. of Ethomid HT/60 and 44.8 g. of Nacconate 200 are stirred at 110° C. for an hour, cooled to 60° C. and there is then added 84 ml. Nacconate 80, 56 ml. dimethyl formamide and 56 ml. Ethomid HT/60 to form the prepolymer. With 500 g. of the prepolymer is intimately admixed 13.4 ml. 5% HT/60 in water.

The foam is similar in properties to that of Example I but it is more resistant to tearing, both wet and dry.

We have also discovered that the tear resistance of the foams and films is substantially increased by the addition of diols such as 1,4-butanediol, polyoxypropylene glycol (M.W. 425), alone or mixed, to the reaction mixture in the formation of the prepolymer. The upper limit of the amount of the diols which can be added depends upon several factors. One is that the final reaction product must have an ethylene oxide content of 30 to 80% by weight. Another is that the addition cannot be such as to render the reaction mixture so viscous as to prevent foam formation. Still another is the nature of the diol itself. Thus with 1,4-butanediol about 7% by weight of the final product yields a viscosity which is too high to permit foam formation. On the other hand with polyoxypropylene glycol (M.W. 425—Niax Diol, Union Carbide Inc., New York, N.Y.) as much as 33% by weight of the final product could be employed.

The following are non-limitative examples of foams made with diols that have been added to the surfactant.

*Example VIII*

160 g. Ethomid HT/60, 24 ml. Niax Diol 425 and 20.8 ml. Nacconate 80 are stirred for about 1½ hours at 110° C. Then 48 ml. more of Nacconate 80 are added, and the reaction mixture cooled to 60° C. 32 ml. dimethyl formamide and 32 ml. Ethomid HT/60 are added to form the prepolymer. 1.12 ml. $H_2O$ is intimately and quickly mixed with 45 g. of the prepolymer to form the foam which is placed in a 70° C. oven and allowed to cure at least 24 hours.

In this example, the Niax Diol 425 approximates 8% by weight of the final foam.

*Example IX*

90 g. Ethomid HT/60, 5.5 g. 1,4-butanediol and 15 ml. Nacconate 80 are stirred for about 1 hour at 110° C. Then 24 ml. more of Nacconate 80 are added and the reaction mixture cooled to 60° C. 16 ml. dimethyl formamide and 16 ml. Ethomid HT/60 are added to form the prepolymer. 1.12 ml. H₂O is intimately and quickly mixed with 45 g. of the prepolymer to form the foam which is placed in a 70° C. oven and allowed to cure at least 24 hours.

In this example, the 1,4-butanediol approximates 3.5% by weight of the final foam.

*Example X*

160 g. Ethomid HT/60, 24 ml. Niax Diol 425, 6.0 ml. 1,4-butanediol and 29.6 ml. Nacconate 80 are stirred for about 1 hour at 110° C. 48 ml. more of Nacconate 80 are added and the reaction mixture cooled to 60° C. 32 ml. dimethyl formamide and 32 ml. Ethomid HT/60 are added to form the prepolymer. 1.12 ml. H₂O is intimately and quickly mixed with 45 g. of the prepolymer to form the foam which is placed in a 70° C. oven and allowed to cure at least 24 hours.

In this example, the combined diols approximate 10% by weight of the final foam.

*Example XI*

20 g. Ethomid HT/60, 24 ml. Niax Diol 425 and 10.7 ml. Nacconate 80 are stirred for about 1 hour at 110° C. Then 13 ml. more of Nacconate 80 are added and the reaction mixture cooled to 60° C. 4 ml. dimethyl formamide and 4 ml. Ethomid HT/60 are added to form the prepolymer. 0.63 ml. H₂0 is intimately and quickly mixed with 25 g. of the prepolymer to form the foam which is placed in a 70° C. oven and allowed to cure at least 24 hours.

In this example, the Niax Diol 425 approximates 33% by weight of the final foam.

The prepolymers mentioned in the examples need not be treated with water to make the foams. Instead they can be dissolved in a dry organic solvent, such as benzene, and poured onto a dry polyethylene plate. After exposure at room temperature and to normal humidity for about 72 hours a cured film is formed which can readily be pulled off the plate. The film is tough, will adhere to itself when stretched, but can be peeled off from itself.

We claim:

1. A product consisting of a solid shaped body formed by the reaction of an organic diisocyanate and a surfactant, wherein the diisocyanate is present in an amount exceeding the stoichiometric amount necessary for the reaction and wherein the surfactant comprises sequentially added hydrophobic and hydrophilic portions, the hydrophobic portion being an alkyl amide, and the hydrophilic portion comprising at least two ethylene oxide chains individually linked to the hydrophobic portion, the reaction product being cured and having an ethylene oxide content of 30–80% by weight.

2. The product of claim 1 wherein the surfactant is the addition product of a fatty acid amide and about 5–100 moles of ethylene oxide for each mole of the fatty acid amide present in the surfactant.

3. The product of claim 1 wherein the surfactant is the addition product of hydrogenated tallow amide with 50 moles of ethylene oxide present for each mole of the hydrogenated tallow amide, the surfactant having an average molecular weight of about 2478.

4. The product of claim 1 wherein a basic catalyst has been added to the reactants.

5. The product of claim 1 wherein dimethyl formamide has been added to the reactants as a catalyst.

6. The product of claim 1 wherein the organic diisocyanate consists of a mixture of 2,4-tolylene diisocyanate and 2,6-tolylene diisocyanate.

7. The product of claim 1 wherein said shaped body is a solidified foam formed by adding water to said reaction product prior to curing.

8. The product of claim 1 wherein said shaped body is a sheet material.

9. The product of claim 1 wherein a dihydric alcohol is added to the reaction mixture in an amount sufficient to increase the tear resistance of the product but sufficiently small to retain adequate fluidity of the mixture to permit foam formation thereof while maintaining the ethylene oxide content of the product at 30–80% by weight.

10. The product of claim 1 wherein a quaternary ammonium halide is added to the surfactant prior to the reaction with the diisocyanate, said quaternary ammonium halide being formed by the reaction of a methyl halide with a tertiary amine having the formula:

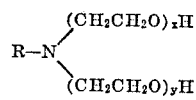

wherein R is a fatty acid alkyl radical of $C_{12}$ to $C_{18}$ and $x+y=$ about 5 to 100.

11. A detergent foam made by reacting a surfactant produced by reacting fatty acid amides and ethylene oxide, which surfactant contains 50 moles ethylene oxide per mole of fatty acid amide, with an equivalent amount of a mixture containing about 65 to 80% of the 2,4 isomer and about 20 to 35% of the 2,6 isomer of tolylene diisocyanate followed by the addition of dimethyl formamide plus an additional quantity of the original surfactant, then adding an amount of the di-isocyanate in excess of that required to react completely with the additional quantity of surfactant and water and finally curing the foam.

12. A detergent foam made by reacting a surfactant produced by reacting fatty acid amides with ethylene oxide, said surfactant containing 50 moles ethylene oxide per mole of fatty acid amide, with an equivalent amount of 3,3′-bitolylene-4,4′ di-isocyanate, then adding an excess of the di-isocyanate followed by the addition of dimethyl formamide plus an additional amount of the original surfactant less than that required to react completely with the excess of the di-isocyanate and finally admixing with water and curing.

References Cited in the file of this patent

UNITED STATES PATENTS

| | | |
|---|---|---|
| 2,494,920 | Warrick | Jan. 17, 1950 |
| 2,650,212 | Windemuth | Aug. 25, 1953 |
| 2,769,732 | Boyd | Nov. 6, 1956 |
| 2,866,774 | Price | Dec. 30, 1958 |
| 2,868,518 | Corby et al. | Jan. 13, 1959 |
| 2,920,983 | Bugosh | Jan. 12, 1960 |
| 2,927,905 | Eckert | Mar. 8, 1960 |
| 2,948,691 | Windemuth et al. | Aug. 9, 1960 |
| 2,955,091 | Kane | Oct. 4, 1960 |
| 2,959,618 | Kyrides | Nov. 8, 1960 |
| 2,962,183 | Rill et al. | Nov. 29, 1960 |
| 2,977,330 | Brower | Mar. 28, 1961 |
| 3,024,207 | Shaw et al. | Mar. 6, 1962 |
| 3,042,631 | Strandskov | July 3, 1962 |

OTHER REFERENCES

Noller: "Chemistry of Organic Compounds," copyright 1951, page 146, pub. by W. B. Saunders Company, Philadelphia, Pa.

"Chem. and Eng. News," volume 35, No. 3, page 78, January 21, 1957.